UNITED STATES PATENT OFFICE.

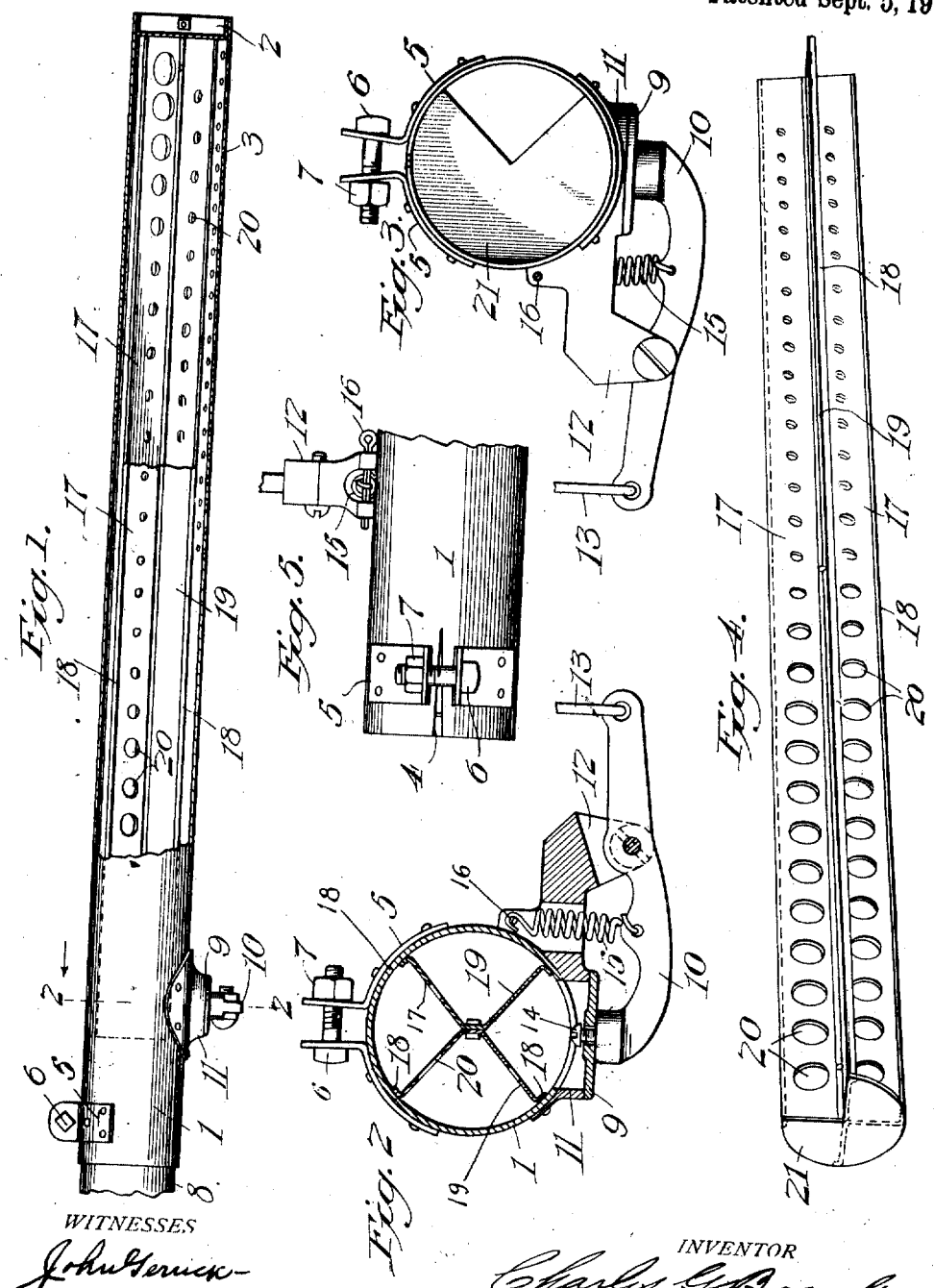

CHARLES G. BOECK, OF JACKSON, MICHIGAN, ASSIGNOR TO NOVELTY MANUFACTURING CO., OF JACKSON, MICHIGAN, A CORPORATION OF MICHIGAN.

AUTOMOBILE-MUFFLER.

1,002,802. Specification of Letters Patent. Patented Sept. 5, 1911.

Application filed February 2, 1911. Serial No. 606,233.

*To all whom it may concern:*

Be it known that I, CHARLES G. BOECK, a citizen of the United States, residing at Jackson, in the county of Jackson and State of Michigan, have invented certain new and useful Improvements in Automobile-Mufflers, of which the following is a specification.

This invention relates to devices for muffling the noise caused by the exhaust of explosive engines used on automobiles and other motor vehicles, and the object of the invention is to provide a simple, efficient, durable, and inexpensive device of the character referred to, which will occupy a small space on the vehicle and will be free from the objectionable weight present in most mufflers heretofore known.

A further object of the invention is to provide a muffler which may be readily applied to any motor vehicle, and which will be provided with a cut-out so located as to avoid any complicated construction of the muffler or of the exhaust pipe.

Other incidental objects of the invention will appear from the following description.

The invention resides in certain novel features of construction and arrangement, a preferred form of which is illustrated in the accompanying drawings, and will be hereinafter first fully described and then more particularly pointed out in the appended claims.

In said drawings, Figure 1 is a view of a muffler embodying my improvements, showing the same partly in side elevation and partly in longitudinal section. Fig. 2 is a transverse section on the line 2—2 of Fig. 1; Fig. 3 is an end elevation looking at the inlet end of the muffler; Fig. 4 is a detail perspective view of the core; Fig. 5 is a detail plan view of the inlet end of the muffler.

In carrying out my present invention, I employ a tubular casing or cylinder 1, one end of which is closed by a cap or other closure 2, and in the wall of the said casing adjacent the said cap 2 I form a longitudinal series of perforations or discharge openings 3. The opposite end of the casing or cylinder 1 is open and slit longitudinally as shown at 4, and upon the outer side of the casing at opposite sides of the said slit, I rigidly secure to the casing brackets 5 through which a clamping bolt 6 is inserted, a nut 7 being mounted on the end of the bolt so that when the said nut is turned home against the adjacent bracket 5, the brackets will be drawn together and the end of the tube firmly clamped around the end of the exhaust pipe 8, as will be readily understood. By reason of this construction I am enabled to secure my muffler directly on the end of any exhaust pipe without requiring a complicated series of connections, and, as the cylinder is but slightly larger than the exhaust tube in its diametrical dimension, it forms practically a continuation of the exhaust pipe and will add very slightly to the weight of the vehicle, whereas a considerable dead weight is imposed upon vehicles by the large, cumbersome mufflers now in general use.

On the under side of the casing or cylinder 1, adjacent the inlet end thereof, I provide a cut-out valve consisting of a disk 9 carried by the end of a lever 10 and adapted to seat against a bracket 11 secured rigidly to the casing and projecting laterally from the same, as clearly shown in Figs. 2 and 3, said bracket having an opening leading into the casing. The lever 10 is pivotally attached between its ends to depending ears 12 of the bracket, the free end of the lever being pivotally connected to the lower end of an operating rod 13 extending up into the body of the vehicle and fitted with means whereby it may be readily manipulated by the chauffeur.

The valve 9 consists of a disk swiveled or otherwise loosely attached to the end of the lever 10 by a screw 14, sufficient play being provided between the disk and the head of the screw to permit the valve to automatically seat itself squarely against the walls of the opening in the bracket 11 as the lever swings toward the said opening. I thus obtain a perfect, tight closure, so that when it is desired to muffle the exhaust to prevent the rapid escape of the gases, the valve may be permitted to remain against its seat and accomplish the desired result with certainty. The valve is normally held against its seat by a spring 15 extending between the lever and a pin 16 or other fixed part of the bracket, as shown clearly in Fig. 2. When it is desired to permit the gases to escape rapidly and directly without passing entirely through the muffler, the operating rod 13 is manipulated so as to swing the valve 9 away from its seat and thus permit the direct escape of the spent gases, as will be understood. It will be observed that the cut-out is arranged directly on the muffler casing adjacent the inlet end thereof so that no alteration of the exhaust pipe already on the engine is needed, and no peculiar complicated connections required. The muffler casing forms a part of the cut-out and the exhaust gases pass directly through the casing to the outside air from the engine exhaust pipe.

It frequently happens, especially in cranking or starting a machine, that back firing or an explosion of gases occurs in the muffler, and mufflers have often been blown to pieces by the force of such explosion, because the cut-out valve was located either on the engine exhaust pipe or at a point so remote therefrom that the explosive pressure exerted no force thereon. In my present device, the cut-out valve is so located that the force of an explosion will press open the valve and permit the gases to escape so that damage to the muffler can not occur.

Removably fitted within the tubular casing or cylinder 1 is a core consisting of a plurality of longitudinal baffles 17 which are arranged to extend diametrically across the interior of the casing, and which, in the present instance, are shown as consisting of two plates of sheet metal bent into V-form in cross section and riveted together at their apexes so as to provide a rigid structure.

The outer edges of the baffles are formed into flanges 18 which bear against the inner wall of the cylinder and thereby avoid the cutting of the cylinder or the wearing of grooves therein, and also serve to prevent buckling of the baffles as they are inserted or withdrawn, or tend to expand or contract under the variations in the temperature occasioned by the use and disuse of the vehicle. One of the baffles, indicated at 19, is imperforate throughout its length, while the other baffles are provided with transverse perforations 20 and the said perforations successively decrease in area from one end of each baffle to the opposite end, the larger perforations in the alternating baffles being at opposite ends of the same, as will be readily understood, and as shown in the drawings. At the inlet end of the core, I provide a closure 21, which is secured to the baffles, and is of a segmental form, so that the space between the imperforate baffle 19 and one of the adjacent perforated baffles is left unbridged, while the remaining space is bridged by the said closure, and, consequently, the incoming exhaust gases are forced to enter the muffler between the imperforate baffle and the perforated baffle most remote from the discharge openings 3, as will be readily understood from the drawings.

The core is inserted in the casing in such position that the unbridged portion thereof will be out of alinement with the discharge openings 3 in the casing, and consequently the gases cannot pass directly to the said openings. It will also be noted that the perforations in that baffle which forms one side of the inlet passage are largest at the entrance end, while the largest perforations in the next baffle, proceeding in a circular path around the casing, are at the closed end of the casing.

The exhaust gases passing into the muffler between the unbridged baffles will travel to the closed end of the muffler under the pressure from the engine and will gradually expand so as to lose some of their force. The gases are thrown back by the impact against the closure 2 and will then escape through the perforations 20 into the second section or chamber of the muffler, and inasmuch as the perforations now encountered successively increase in area in the opposite direction, the great volume of the gases will be forced to travel toward the closed end of the casing a second time before escaping into the third section or compartment of the muffler. The gases then pass into the fourth or remaining section of the muffler, and thence finally escape through the discharge openings 3 in the casing, as will be readily understood. It will be noted that the gases have a circulation in a circular direction around the interior of the muffler, and also have a tortuous circulation longitudinally of the same, so that by the time they reach the discharge openings 3, they are expanded to such a degree as to lose substantially all of their original tension, and will consequently pass through the discharge openings without any noise. Inasmuch as the tortuous circulation and expansion of the gases will reduce their velocity while at the same time preventing their accumulation in any one corner or angle of the device, the back pressure upon the engine is reduced to a minimum.

It will be further noted that the core consisting of the baffles and the segmental closure at the inlet end of the same is removable as an entirety so that repairs may be easily made and it will not be necessary to supply an entirely new muffler should any one of the baffles become defective for any reason. This removability of the core, furthermore, facilitates the construction of the device, while at the same time reducing the cost, inasmuch as the casing may be made from any ordinary tubing, and the core simply moved longitudinally thereinto. When in use, the core will be held firmly in place within the casing and will extend from the cap 2 against which it abuts to a point near the cut-out.

Having thus described my invention, what I claim is:

1. A muffler comprising a cylinder having a closed rear end and an open front end, and a plurality of longitudinal baffles therein, all said baffles terminating short of the open front end of the cylinder and abutting the rear closed end thereof.

2. A muffler comprising a tubular casing, a plurality of baffles disposed longitudinally within the casing and meeting at the axial center thereof, and means whereby the gases within the casing are given a tortuous circulation between the baffles while passing around the interior of the casing.

3. A muffler comprising a tubular casing, and a plurality of diametrical baffles disposed longitudinally within the casing and extending entirely across the same.

4. A muffler comprising a tubular casing having a closed outer end and a series of discharge openings near said end, a plurality of baffles disposed longitudinally within the casing and comprising a perforated and an imperforate baffle spanning the discharge openings, and a segmental closure bridging the space between the inner ends of said baffles.

5. A muffler comprising a tubular casing having discharge openings near one end and an inlet at the opposite end, a longitudinal imperforate baffle within the casing between the inlet and the discharge openings, and a plurality of longitudinal perforated baffles, the perforations in said baffles increasing successively in area from opposite ends of alternate baffles.

6. A muffler comprising a tubular casing, and a removable core slidably fitted in the casing and comprising a plurality of longitudinal baffles.

7. A muffler comprising a tubular casing, and a removable core slidably fitted in the casing and comprising a plurality of longitudinal baffles, and a closure bridging some of the baffles at one end of the core.

8. A muffler comprising a tubular casing, and a removable core slidably fitted in the casing and comprising a plurality of longitudinal baffles, one of said baffles being imperforate and the remaining baffles having transverse perforations increasing successively in area from opposite ends of the alternate baffles.

9. A muffler comprising a tubular casing having a closed outer end and an open inner end, and a core fitted within the casing against the closed end and removable bodily through the open end thereof and having a partly closed inner end and comprising a plurality of longitudinal baffles.

10. A muffler comprising a tubular casing, and a core fitted therein and consisting of a pair of longitudinal plates V-shaped in cross-section and rigidly secured together at their apexes.

11. A muffler comprising a tube having a split end adapted to engage over the end of an exhaust pipe, brackets rigidly secured on the tube at opposite sides of the split end, a securing bolt inserted through the said brackets, and a plurality of longitudinal baffles within the casing.

12. A muffler comprising a tubular casing having an inlet at one end, baffles therein terminating short of said inlet and a cut-out valve located on the side of the casing adjacent the inlet end thereof.

13. A muffler consisting of a tubular casing, a plurality of baffles therein, a bracket secured to the side of the casing and having an opening therethrough leading laterally to the interior of the casing, a lever pivoted between its ends to the outer end of said bracket, a valve disk loosely fitted on the inner end of said lever and adapted to seat externally against the bracket over the opening therein, and a spring secured to the lever and the said bracket to hold the valve normally seated.

14. A muffler comprising a tubular casing, and a core removably fitted therein, said core consisting of a pair of plates V-shaped in cross-section rigidly secured together at their apexes, and a segmental closure secured to said core at one end of the same, said closure being arranged to leave one space formed by said plates unbridged.

15. A muffler comprising a tubular casing, and a removable core adapted to fit therein, said core consisting of a pair of longitudinal plates V-shaped in cross-section and secured rigidly together at their apexes, one plate being transversely perforated throughout both its branches, and the other plate being perforated transversely through one of its branches and having its other branch imperforate, and a segmental closure secured to the ends of said plates and extending from the said imperforate branch of one plate across the other plate and terminating at the perforated branch of the first mentioned plate.

16. A muffler comprising a cylinder having an inlet at one end, baffles within the cylinder terminating short of said inlet, a discharge remote from the inlet, and a cutout valve on the side of the cylinder between said inlet and said baffles.

In testimony whereof I affix my signature, in presence of two witnesses.

CHARLES G. BOECK.

Witnesses:
D. R. TARBELL,
G. D. HAWKINS.